United States Patent [19]

Schuiling et al.

[11] Patent Number: 4,544,290
[45] Date of Patent: Oct. 1, 1985

[54] APPARATUS FOR MOUNTING A DAISY WHEEL IN A DAISY WHEEL PRINTER

[75] Inventors: Theodorus A. Schuiling, Wijchen; Gijsbertus B. Morsing, Heumen, both of Netherlands

[73] Assignee: Daisy Systems Holland B.V., Netherlands

[21] Appl. No.: 595,345

[22] Filed: Mar. 30, 1984

[30] Foreign Application Priority Data

Apr. 7, 1983 [NL] Netherlands ......................... 8301217
Nov. 18, 1983 [NL] Netherlands ......................... 8303972

[51] Int. Cl.⁴ .............................................. B41J 1/30
[52] U.S. Cl. .................................. 400/175; 400/144.2; 403/245; 403/263
[58] Field of Search ................... 400/144.2, 174, 175; 403/244, 245, 246, 247, 256, 263, 242

[56] References Cited

U.S. PATENT DOCUMENTS

| | | | |
|---|---|---|---|
| 4,161,373 | 7/1979 | Chvatlinsky | 400/175 |
| 4,314,770 | 2/1982 | Harre | 400/175 |
| 4,389,130 | 6/1983 | Giolitti | 400/175 |

FOREIGN PATENT DOCUMENTS 148034 5/1981 German Democratic Rep. ................................. 400/144.2

Primary Examiner—Edgar S. Burr
Assistant Examiner—David A. Wiecking
Attorney, Agent, or Firm—Kane, Dalsimer, Kane, Sullivan and Kurucz

[57] ABSTRACT

An apparatus for mounting a daisy wheel on a shaft driven by a motor in a daisy wheel printer comprises a driving head carried by the driven shaft at its free end, while the daisy wheel is provided with a coupling member. This coupling member is adapted to be coupled in a rotation fixed manner with and to be removed from the driving head by moving the daisy wheel in a substantial radial direction. A locking means is movable between a release position in which the daisy wheel is movable in a substantial radial direction with respect to the driving head and a working position in which the daisy wheel is locked on the driving head.

A daisy wheel to be used in a printer with such an apparatus, comprises a central portion and a number of radially extending spokes carrying at their ends a letter, figure or a similar character. Two ribs are formed in V-shape on the one side of the daisy wheel.

14 Claims, 4 Drawing Figures

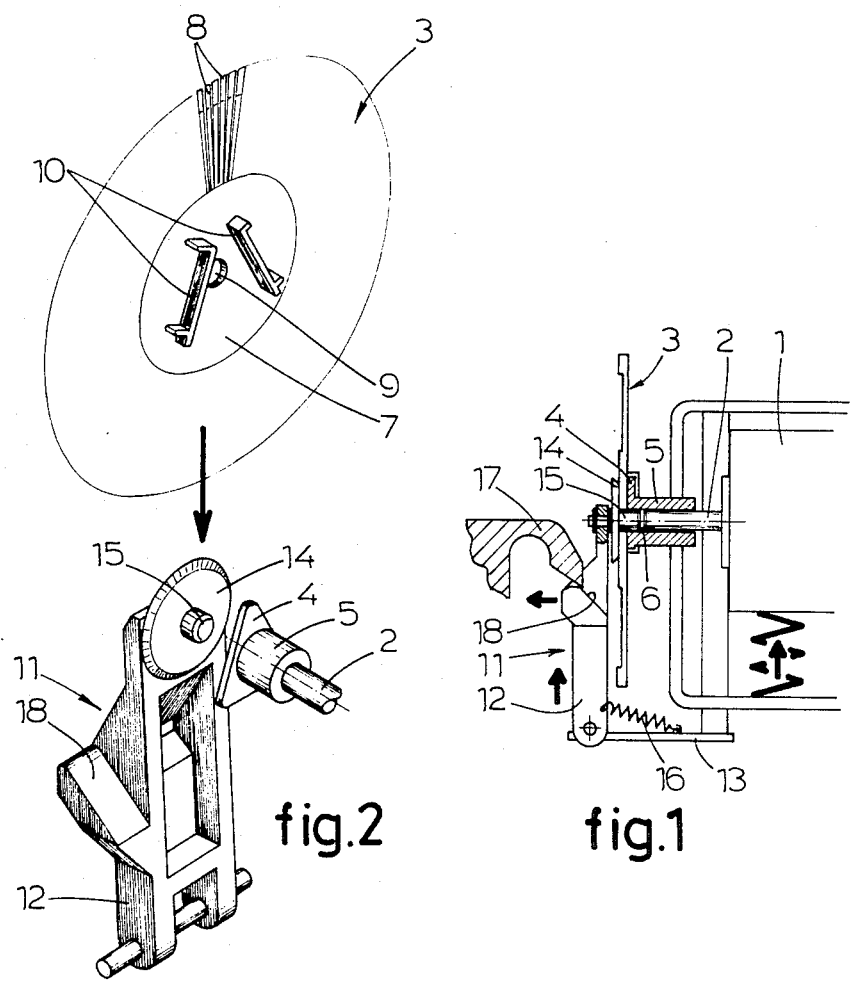

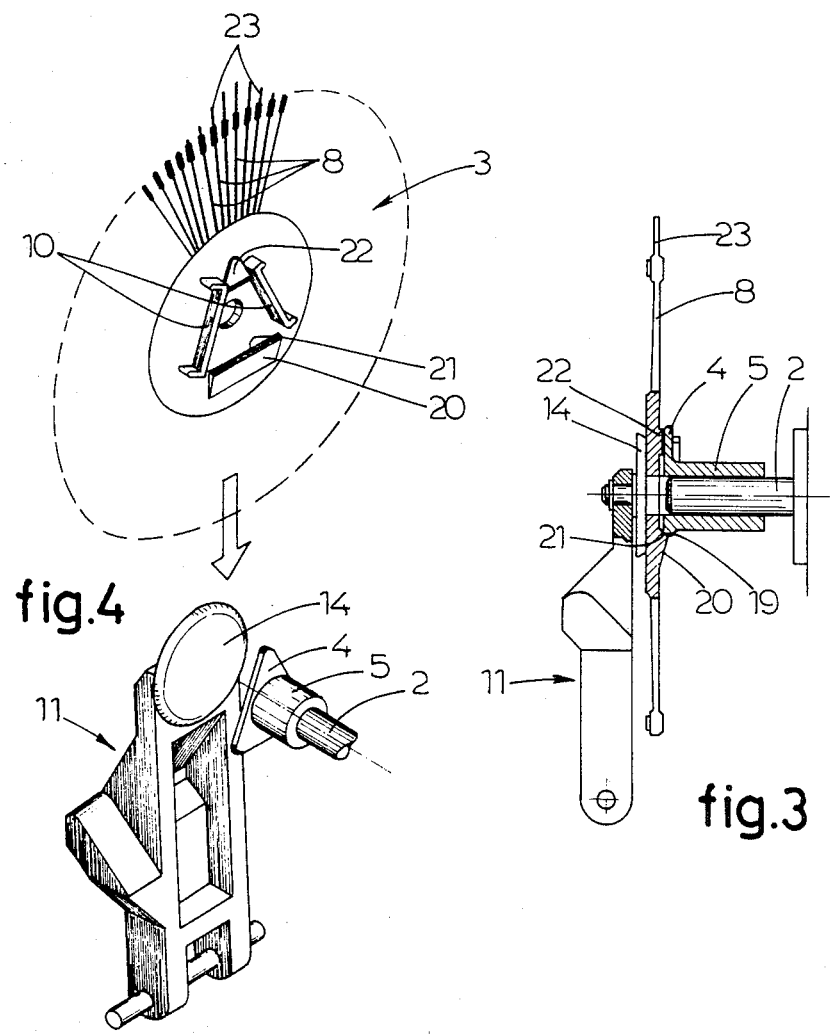

APPARATUS FOR MOUNTING A DAISY WHEEL IN A DAISY WHEEL PRINTER

The invention relates to an apparatus for mounting a daisy wheel in a daisy wheel printer on a shaft driven by a motor, said printer comprising a carriage which supports the motor and the driven shaft and is movable with respect to a recording medium, and to a daisy wheel to be used at a printer comprising such an apparatus.

For mounting the daisy wheel on the driven shaft at the known printers, the motor with the shaft is toppled out of its working position in order to mount or exchange the daisy wheel. In order to topple the motor a relatively expensive construction is required as the required mechanical components have to be very accurate to guarantee a fixed working position of the motor remaining exactly the same during the operational life of the printer. A very small variation of this working position already has a strong adverse effect on the quality of the printed character. Moreover, the daisy wheel for the known printers comprises a rubber cap for mounting purposes, by means of which the daisy wheel can be pushed on the driven shaft. During mounting the user should handle very accurately as the daisy wheel with the rubber cap can easily be mounted in an oblique position on the driven shaft.

The invention aims to provide an apparatus and daisy wheel of the above-mentioned kind, wherein said disadvantages are obviated in a simple but nevertheless effective manner.

To this end, the apparatus according to the invention is characterized in that said driven shaft carries a driving head at its free end and in that the daisy wheel is provided with a coupling member adapted to be coupled in a rotation fixed manner with and to be removed from the driving head by moving the daisy wheel in a substantial radial direction, wherein a locking means is provided which locking means is movable between a release position in which the daisy wheel is movable in a substantial radial direction with respect to the driving head, and a working position in which the daisy wheel is locked on the driving head.

Thereby, the topple movement of the motor with the shaft is not necesarry so that a fixed working position of the motor and the driven shaft during the whole operational life is guaranteed. The daisy wheel can be mounted or exchanged very simply at the apparatus according to the invention when the locking means is placed in the release position, so that the user can not make any mistakes.

Preferably, the driving head is formed as an equilateral triangle, while the coupling member of the daisy wheel includes two ribs formed in a V-shape on the one side of the daisy wheel, which ribs engage two triangle sides of the driving head in the operating position of the daisy wheel.

According to a favourable embodiment of the invention the locking means comprises a pivotably borne arm carrying a pressure disc rotatably borne in said arm and having a central centring boss which can fittingly be received in a central opening of the daisy wheel.

According to a preferred embodiment of the invention the driving head and said one side of the daisy wheel are provided with co-operating oblique locating surfaces, wherein the locking means in the working position presses the daisy wheel on the driving head in such a manner that the ribs placed in V-shape are clamped against the corresponding triangle sides of the driving head due to the action of the co-operating locating surfaces. In this manner a good abutment of the ribs placed in V-shape against the driving head is guaranteed continuously, whereby wear is prevented and a long operational life is guaranteed.

The invention further provides a daisy wheel to be used in a printer comprising the apparatus described, said daisy wheel comprising a central portion and a number of radially extending spokes carrying at their ends a letter, figure or a similar character, and according to the invention being characterized in that two ribs are formed in a V-shape on the one side of the daisy wheel.

The invention will be further explained by reference to the drawings in which two embodiments are shown.

FIG. 1 shows a schematical cross-section of a portion of a carriage of a printer provided with an embodiment of the apparatus according to the invention.

FIG. 2 is a perspective view of a portion of the apparatus of FIG. 1, the daisy wheel being removed from the driving head.

FIG. 3 is a partially shown cross-section corresponding to FIG. 1 in a larger scale, in which a second embodiment of the apparatus according to the invention is shown.

FIG. 4 is a perspective view of a portion of the apparatus of FIG. 3, the daisy wheel being removed from the driving head.

Referring to FIG. 1 there is schematically shown a cross-section of a part of a carriage of a daisy wheel printer not further shown. This carriage is movable with respect to a recording medium on which the printer can print data.

The carriage supports a motor 1 with a motor shaft 2, and an apparatus for mounting a daisy wheel 3 on the motor shaft 2. To this end, a driving head is fixed on the free end of the motor shaft 2, said driving head having the form of an equilateral triangle and clamped on the motor shaft 2 by means of a bush 5 formed on the driving head 4. The driving head 4 is provided with a central bore 6 extending through the driving head.

The daisy wheel 3 is made in a usual manner as a mainly closed central disc 7 having a great number of radially extending spokes 8 at its circumference. At the ends of said spokes 8 different characters are provided, such as letters, figures and the like. A central opening 9 is formed in the disc 7. Further, two ribs 10 are formed in V-shape on the disc 7 as can especially be seen in FIG. 2. The ribs 10 engage two triangle sides of the driving head 4 in the operating position of the daisy wheel 3 shown in FIG. 1. In this manner the daisy wheel 3 is movable in a substantial radial direction with respect to the driving head 4, whereas the daisy wheel in the operating position of FIG. 1 is coupled in a rotation fixed manner with the driving head 4 by the co-operation between the ribs 10 and the driving head 4.

Further, the apparatus described comprises a locking means 11 for locking the daisy wheel 3 on the driving head 4. The locking means 11 comprises an arm 12 shown in detail in FIG. 2, which arm 12 is pivotably supported by a support 13 of the carriage. At the end of the arm 12 opposite of the support 13 a pressure disc 14 is rotatably borne, which pressure disc 14 has a central centring boss 15. The arm 12 is biased in the working position of FIG. 1 by a spring 16 schematically indicated, in which working position the pressure disc 14 presses the daisy wheel 3 on the driving head 4, wherein the boss 15 extends through the central opening 9 in the daisy wheel 3 into the bore 6. Thereby, the daisy wheel 3 is completely fixed to the motor shaft 2 in the position shown in FIG. 1.

For mounting or exchanging the daisy wheel 3, the arm 12 should be pivoted to the release position schematically shown in FIG. 2. At the described apparatus the motor 1 with the motor shaft 2 and the arm 12 can be shifted in a vertical direction from the working position of FIG. 1 to a rest position not shown, which is indicated by arrows in FIG. 1. This vertical shifting of the motor can be realised in a simple manner, wherein the working position of the motor 1 is remained during the whole operational life of the printer without expensive constructions. At the upward movement of the arm 12 an actuating means 17 which is a part of the carriage engages a ramp surface 18 of the arm 12, whereby the arm 12 is moved away from the driving head 4 and arrives in the release position. Thereafter, the daisy wheel 3 can be easily removed or mounted, wherein mounting mistakes of the user are substantially precluded.

FIGS. 3 and 4 show a second embodiment of the apparatus according to the invention which mainly corresponds to the apparatus of FIGS. 1 and 2 and wherein corresponding parts are indicated by the same reference numbers.

In this embodiment the triangle sides of the driving head 4 each are provided with an oblique part 19 acting as a locating surface, while a third rib 20 is formed on the side of the daisy wheel 3 carrying the ribs 10, which third rib 20 together with the ribs 10 determines an equilateral triangle corresponding to the driving head 4. The rib 20 having only a small heigth with respect to the surface of the daisy wheel 3 carries an obliquely extending locating surface 21 at its side directed to the ribs 10 placed in V-shape. In the operating position of the daisy wheel the locating surface 21 co-operates with one of the oblique parts 19 of the driving head 4.

During operation the locking means 11 presses with its pressure disc 14 which has no centring boss in this case, the daisy wheel 3 on the driving head, wherein of course the pressure disc is concentric with the daisy wheel 3 and the motor shaft 2. Thereby, the ribs 10 placed in V-shape will be clamped against the corresponding triangle sides of the driving head 4 due to the co-operating locating surfaces 19 and 21 of the driving head 4 and the daisy wheel 3, respectively, so that there is no clearance between these ribs 10 and the driving head 4. In this manner wear of the daisy wheel 3 and the driving head 4 is restricted to a minimum so that a long operational life is guaranteed.

When the locking means 11 is in the release position of FIG. 4, the daisy wheel 3 can be easily removed or mounted in this embodiment too.

The side of the rib 20 opposite locating surface 27 extends obliquely towards the surface of the daisy wheel as shown so that as the wheel 3 is mounted on 4, rib 20 slides past the head until surface 27 of the wheel engages oblique part 19 of head 4 as shown. In operation, as pressure disc 14 pushes wheel 3 axially toward motor shaft 2, the oblique locating surfaces 19 and 21 coact to urge wheel 3 downward clamping the ribs 10 against the two corresponding triangular sides of head 4.

It is clear from the above and FIG. 3 that the surface area of the wheel 3 located immediately above locating rib 20 does not contact the corresponding portion of head 4, but is offset axially therefrom. In order to compensate for this axial offset and maintain the wheel substantially perpendicular to motor shaft 2, the wheel is provided with a raised portion 22 formed between the ribs 10 opposite rib 20. The surface of the raised portion 22 is parallel to the plane of the wheel.

At the daisy wheel 3 shown in FIGS. 3 and 4 some of the spokes 8, the ends of which lie on a circular arc which lies approximately within the angle opposite of the angle enclosed by the ribs 10, carry an extension 23 lying in radial direction beyond the character. Taking out of the daisy wheel 3 and mounting the daisy wheel 3 in the right manner is thereby facilitated.

The invention is not restricted to the above-described embodiments which can be varied in a number of ways.

For example, it is possible to fixedly mount the motor 1 with the motor shaft 2 and the arm 12, and to slidingly mount the actuating means 17 in order to pivot the arm 12.

Further, a plurality of the spokes 8 of the daisy wheel 3 shown in FIGS. 1 and 2 may also have an extension 23.

We claim:

1. Apparatus for mounting a daisy wheel with a wheel side in a daisy wheel printer on a shaft driven by a motor, said printer comprising a carriage which supports the motor and the driven shaft wherein said drive shaft carries a driving head with three head sides formed as an equilateral triangle at its free end and the daisy wheel is provided with a coupling member adapted to be coupled in a fixed manner with the driving head and to be removed from said driving head by moving the daisy wheel in a substantially radial direction, wherein a locking means is provided which locking means is movable between a release position in which the daisy wheel is movable in a substantially radial direction with respect to the driving head, and a working position in which the daisy wheel is locked on the driving head, said locking means including two ribs formed in a V-shape on the wheel side, which ribs engage two head sides in the operating position of the daisy wheel.

2. Apparatus according to claim 1, wherein the locking means comprises a pivotably borne arm carrying a pressure disc rotatably borne in said arm and having a central centering boss which can fittingly be received in a central opening of the daisy wheel.

3. Apparatus according to claim 2, wherein the driving head has a central bore, and said centering boss has a protruding length which is greater than the thickness of the daisy wheel.

4. Apparatus according to claim 1, wherein the driving head and said wheel side are provided with co-operating oblique locating surfaces, and wherein the locking means in the working position presses the daisy wheel on the driving head in such a manner that the ribs placed in V-shape are clamped against the corresponding triangle sides of the driving head due to the action of the co-operating locating surfaces.

5. Apparatus according to claim 4, wherein the head sides each are provided with an oblique part as a locating surface, while a third rib is formed on said one side of the daisy wheel, which third rib together with the ribs placed in V-shape determines an equilateral triangle and carries the locating surface of the daisy wheel at its side directed to the ribs placed in V-shape.

6. Apparatus according to claim 5, wherein a raised part is formed on the daisy wheel between the ribs placed in V-shape opposite of the rib with the locating surface, said raised part having a surface parallel to the plane of the daisy wheel.

7. Apparatus according to claim 4, wherein the locking means comprises a pivotably borne arm carrying a pressure disc rotatably borne in said arm, which pressure disc concentrically abuts against the daisy wheel in the working position of the locking means.

8. Apparatus according to claim 2 or 7, wherein the arm is biased in the working position by a spring, while an actuating means is provided for pivoting the arm to the release position.

9. Apparatus according to claim 8, wherein the motor with the driven shaft and the arm can be shifted in a vertical direction with respect to the carriage between a working and a rest position, wherein the carriage supports the actuating means which co-operates with a ramp surface of the arm.

10. Daisy wheel to be used in a printer with a shaft driven by a motor, a carriage for supporting the motor and the shaft, a driving head mounted on said shaft and having three head sides formed in an equilateral triangle around said shaft, said daisy wheel comprising a wheel side, a central portion and a number of radially extending spokes carrying at their ends a letter, a figure or a similar character, wherein two ribs are formed in a V-shaped on the wheel side for engaging two head sides when said wheel is placed in an operating position in said printer.

11. Daisy wheel according to claim 10, wherein a third rib is provided on said wheel side, which third rib together with the ribs placed in V-shape determines an equilateral triangle and carries a locating surface at its side directed to the ribs placed in V-shape, said locating surface obliquely extending to the surface of the daisy wheel.

12. Daisy wheel according to claim 11, wherein that side of the third rib opposite of the locating surface obliquely extends to the surface of the daisy wheel.

13. Daisy wheel according to claim 11, wherein a raised part is formed on the daisy wheel between the ribs placed in V-shape opposite of the rib with the locating surface, said raised part having a surface parallel to the plane of the daisy wheel.

14. Daisy wheel according to claim 10 or 11, wherein a plurality of spokes the ends of which lie on a circular arc lying approximately within the angle opposite of the angle enclosed by the ribs placed in V-shape, are extended in a radial direction beyond the end with the character.

* * * * *